United States Patent [19]

Okajima et al.

[11] Patent Number: 5,721,742
[45] Date of Patent: Feb. 24, 1998

[54] TERMINAL, NETWORK, AND COMMUNICATION SYSTEM

[75] Inventors: Ichiro Okajima; Akihiro Maebara, both of Yokohama; Shoichi Hirata, Tokyo; Katsumi Kobayashi, Yokohama, all of Japan

[73] Assignee: NTT Mobile Communications Network Inc., Tokyo, Japan

[21] Appl. No.: 641,501

[22] Filed: May 1, 1996

[30] Foreign Application Priority Data

May 19, 1995 [JP] Japan .................................. 95-121677

[51] Int. Cl.$^6$ ........................................................ H03M 13/00
[52] U.S. Cl. .................................................. 371/35; 371/41
[58] Field of Search ........................................ 371/35, 41

[56] References Cited

U.S. PATENT DOCUMENTS 3,078,443  2/1963  Rose .................................. 371/41
3,496,549  2/1970  Tong .................................. 371/41
3,506,961  4/1970  Abramson et al. ................. 371/41

FOREIGN PATENT DOCUMENTS

196733  7/1992  Japan .

*Primary Examiner*—Stephen M. Baker
*Attorney, Agent, or Firm*—Scully, Scott Murphy and Presser

[57] ABSTRACT

A transmittal signal is transmitted in a forward error correction format in case the length of the transmittal signal satisfies predetermined conditions but not in a forward error correction format in case the length of the transmittal signal does not satisfy the predetermined conditions. Owing to this arrangement, a long signal susceptible to errors, can be encoded in a forward error correction format. For transmitting a short transmittal signal, wasteful consumption of transmission data capacity of a radio channel can be prevented.

14 Claims, 10 Drawing Sheets

FIG. 10

TERMINAL, NETWORK, AND COMMUNICATION SYSTEM

BACKGROUND OF THE INVENTION

1. [Field of the Invention]

This invention relates to a terminal, a network, and a communication system for performing a communication through a radio channel. More particularly, the invention relates to a mobile station, a base station, a network, and a communication system in which a transmittal signal is encoded in a forward error correction format in accordance with conditions of communication.

2. [Background of the Invention]

In a mobile communication system, line quality of a radio channel tends to vary both time-wise and place-wise due to fluctuation (fading) of the receiving level of signal, the fluctuation being liable to occur as the mobile station moves. When the line quality is good, no errors occur to the signal transmitted between the mobile station and the network. However, when the line quality deteriorates, the signal is often subjected to errors. In order to obtain higher reliability of the line by correcting those errors, the forward error correction (FEC) and/or automatic repeat request (ARQ) is employed in the mobile communication system. In the forward error correction technique, the signal transmitter side adds data for correcting errors to a transmittal signal. The receiver side corrects the errors in the signal with reference to those data for correction. Various forward error correction encoding methods having different capabilities for error correction are known. In general, the more the correction capability increases, the more the amount of data required for correcting errors increases and as a result, the signal transmission capacity of the radio channel decreases to that extent.

[SUMMERY OF THE INVENTION]

In the conventional mobile communication system, the forward error correction encoding method ensuring sufficiently high reliability for signal transmission even in the event that the line quality of the radio channel is inferior is selected, and such selected forward correction encoding method is normally used. However, this conventional technique has such a problem that since the same forward error correction encoding technique is applied even after the line quality is recovered, the signal transmission capacity of the radio channel is wastefully consumed to that extent.

Further, the mobile communication system usually requires different types of transmission reliability depending on the kind of signals. For example, those signals, which are used for communication control, require a higher reliability than other signals, in order to correctly control the communication. In the conventional mobile communication system, when plural kinds of signals are transmitted in a single radio channel, the error-correction encoding is regularly constantly utilized for signal transmission through the radio channel in case some signals (one signal is enough), for which a higher reliability is required, are included in the above-mentioned plural kinds of signal. In this case, however, since even those signals for which a higher reliability is not required are also subjected to error-correction encoding treatment, the signal transmission capacity of the radio channel is wastefully consumed to that extent.

Moreover, in the mobile communication system, signals having a variety of different lengths are transmitted through the radio channel. The longer the lengths of the signals are, the more significantly the line quality is susceptible to change. Thus, transmission reliability decreases. In the conventional mobile communication system, the forward error correction encoding technique is normally utilized for signal communication through the radio channel in order for those signals having long lengths to attain higher reliability. In this conventional method, however, since the forward error correction encoding technique is applied even to those signals which have short lengths enough to attain a reasonable degree of reliability without subjecting the signals to forward error correction encoding treatment, the signal transmission capacity of the radio channel is wastefully consumed to that extent.

It is, therefore, an object of the present invention to provide a mobile station, a network and a communication system, in which reduction of signal transmission capacity of a radio channel due to forward error correction encoding operation can be suppressed to the minimum without sacrificing the reliability of signal transmission by making a judgment as to whether a forward error correction encoding operation should be carried out, depending on the kind or length of a transmittal signal.

It is another object of the present invention to provide a terminal and a communication system, in which a transmittal signal can efficiently be encoded in a forward error correction format when a signal encoded in a forward error correction format, is received.

In order to achieve the above objects, the present invention offers the following operations and functions.

In the terminal as defined in claim 1, the transmittal signal is encoded in a forward error correction format in case the length of a transmittal signal satisfies predetermined conditions. Accordingly, long signals, which are often susceptible to errors even if the line quality is stable, can be encoded in a forward error correction format. On the contrary, in case the length of the transmittal signal does not satisfy the predetermined conditions, this transmittal signal is transmitted without encoded in a forward error correction format. Accordingly, in case a short transmittal signal is transmitted, wasteful consumption of transmission data of the radio channel can be prevented.

In the terminal as defined in claim 2, the transmittal signal is transmitted in a forward error correction format in case the kind of the transmittal signal satisfies the predetermined conditions. The transmittal signal is transmitted without encoded in a forward error correction format in case the kind of the transmittal signal does not satisfy the predetermined conditions. Accordingly, appropriate selection can be made in such a way that a less important signal, for example, is not encoded in a forward error correction format for the reason of efficiency, and an important signal is encoded in a forward error correction format prior to transmission in order to enhance transmission success probabilities.

In the terminal as defined in claim 3, a judgment is made as to whether the received signal is encoded in a forward error correction format so that the forward error correction code of the received signal is decoded only when the judgment result is affirmative. Accordingly, even in case a signal not encoded in a forward error correction format, is present admixed with other signals, the admixed signal can be favorably coped with.

In the terminal as defined in claim 4, the forward error correction code of the received signal is decoded in case the received signal is encoded in a forward error correction format. Also, in case the signal received last, is encoded in a forward error correction format, the transmittal signal is encoded in a forward error correction format and then transmitted. Consequently, it becomes possible to perform a transmission in such a manner as to match with the other party of communication. In case the signal received last, is not encoded in a forward error correction format, the transmittal signal can be transmitted as it is and without being subjected to forward error correction encoding operation. Accordingly, in case the line quality is good, wasteful consumption of the transmission capacity due to forward error correction encoding operation can be prevented.

In a terminal as defined in claim 5, the forward error correction code of the received signal is decoded in case the received signal is encoded in a forward error correction format. In case the signal received last through the radio channel, is encoded in a forward error correction format, the received signal is encoded in a forward error correction format after the passage of a predetermined interval from when the signal was received. In case the signal received last through the radio channel, is not encoded in a forward error correction format, and in case a predetermined interval has passed since when a signal had been received last through the radio channel, the transmittal signal can be transmitted as it is and without being subjected to forward error correction encoding treatment. In case no signal is received at all, the forward error correction encoding operation is stopped after the passage of a predetermined interval. Accordingly, wasteful consumption of transmission capacity can be prevented.

According to the terminal as defined in claim 6, contrary to the case in claim 5, the transmittal signal is usually encoded in a forward error correction format, but when the signal received from the counterpart terminal, is not encoded in a forward error correction format, the transmittal signal is not encoded in a forward error correction format just for a predetermined time. Such an arrangement suitable to be applied to a case where line quality is usually bad but it occasionally changes. That is, since line quality is judged good in case the signal from the counterpart terminal is not encoded in a forward error correction format, the signal is transmitted without being encoded in a forward error correction format just for a predetermined time in order to enhance communication efficiency. In other cases, the signal is encoded in a forward error correction format and then transmitted.

According to the terminal as defined in claim 7, the mobile station judges whether the transmittal signal should be encoded in a forward error correction format.

According to the network as defined in claim 8, at least one of the base stations in the network judges whether the transmittal signal should be encoded in a forward error correction format.

In the communication system as defined in claim 9, the base station judges, according to length or kind of the transmittal signal, whether or not the transmittal signal should be encoded in a forward error correction format. In case the signal received from the base station, is encoded in a forward error correction format, the mobile station decodes the forward error correction code of the received signal.

In the communication system as defined in claim 10, the base station judges, according to the length or kind of the signal, whether the transmittal signal should be encoded in a forward error correction format. In case the signal received last, is encoded in a forward error correction format, the mobile station encodes the transmittal signal in a forward error correction format after the passage of a predetermined time period from when the signal was received. In case the signal received last through the radio channel, is not encoded in a forward error correction format, and in case a predetermined time passed since the signal from the radio channels was received last, the transmittal signal is transmitted as it is and without encoded in a forward error correction format.

In the communication system as defined in claim 11, at least one mobile station judges whether the transmittal signal should be encoded in a forward error correction format based on the length or kind of the signal. The base station decodes the forward error correction code of the received signal in case the signal received from the mobile station, is encoded in a forward error correction format.

In the communication system as defined in claim 12, at least one mobile station in the network judges, according to the length or kind of the signal, whether the transmittal signal should be encoded in a forward error correction format. The base station encodes the transmittal signal in a forward error correction format after the passage of a predetermined time from when the signal was received in case the signal received last through the radio channel, is encoded in a forward error correction format. In case the signal received last through the radio channel, is not encoded in a forward error correction format, and in case a predetermined time interval passed since the signal was received last through the radio channel, the transmittal signal is transmitted as it is and without encoded in a forward error correction format. Owing to the foregoing arrangement, the band area of communication can be prevented from being wastefully consumed by undue or meaningless forward error correction encoding operation.

In the communication system as defined in claim 13, the base station judges, according to the signal length or signal kind, whether the transmittal signal should be encoded in a forward error correction format. The mobile station usually performs, contrary to the cases in claims 11 and 12, the forward error correction encoding operation with respect to the transmittal signal, and in case the signal received from the counterpart station, is not encoded in a forward error correction format, the mobile station does not perform the forward error correction encoding operation just for a predetermined time period.

In the communication system as defined in claim 14, the mobile station judges, according to the signal length or signal kind, whether the transmittal signal should be encoded in a forward error correction format. The base station usually performs, contrary to the cases with claims 11 and 12, the forward error correction encoding operation with respect to the transmittal signal, and in case the signal received from the counterpart station, is not encoded in a forward error correction format, the base station does not perform the forward error correction encoding operation just for a predetermined time period.

As described above, according to the present invention, a judgment is made as to whether the forward error correction encoding operation should be carried out based on the kind of signal. Accordingly, only those signals, which require higher reliability, can be encoded in a forward error correction format. Furthermore, according to the present invention, since a judgment is made as to whether the forward error correction encoding operation should be performed in accordance with the length of signal, only those transmittal signals having a long signal length, which are susceptible to errors, can be encoded in a forward error correction format. Moreover, since the judgment is made as to whether the forward error correction encoding operation should be performed knowing whether the received signal is encoded in a forward error correction format, the requirements for higher reliability and enhanced transmission efficiency can be met in a well balanced manner. Thus, according to the present invention, wasteful consumption of signal transmission capacity of the radio channel due to forward error correction encoding operation can be suppressed without sacrificing the higher reliability required for signal transmission.

DETAILED DESCRIPTION OF THE PREFERRED EMBODIMENTS

Several embodiments of the present invention will now be described with reference to the accompanying drawings.
(Embodiment 1)

Figure 1:
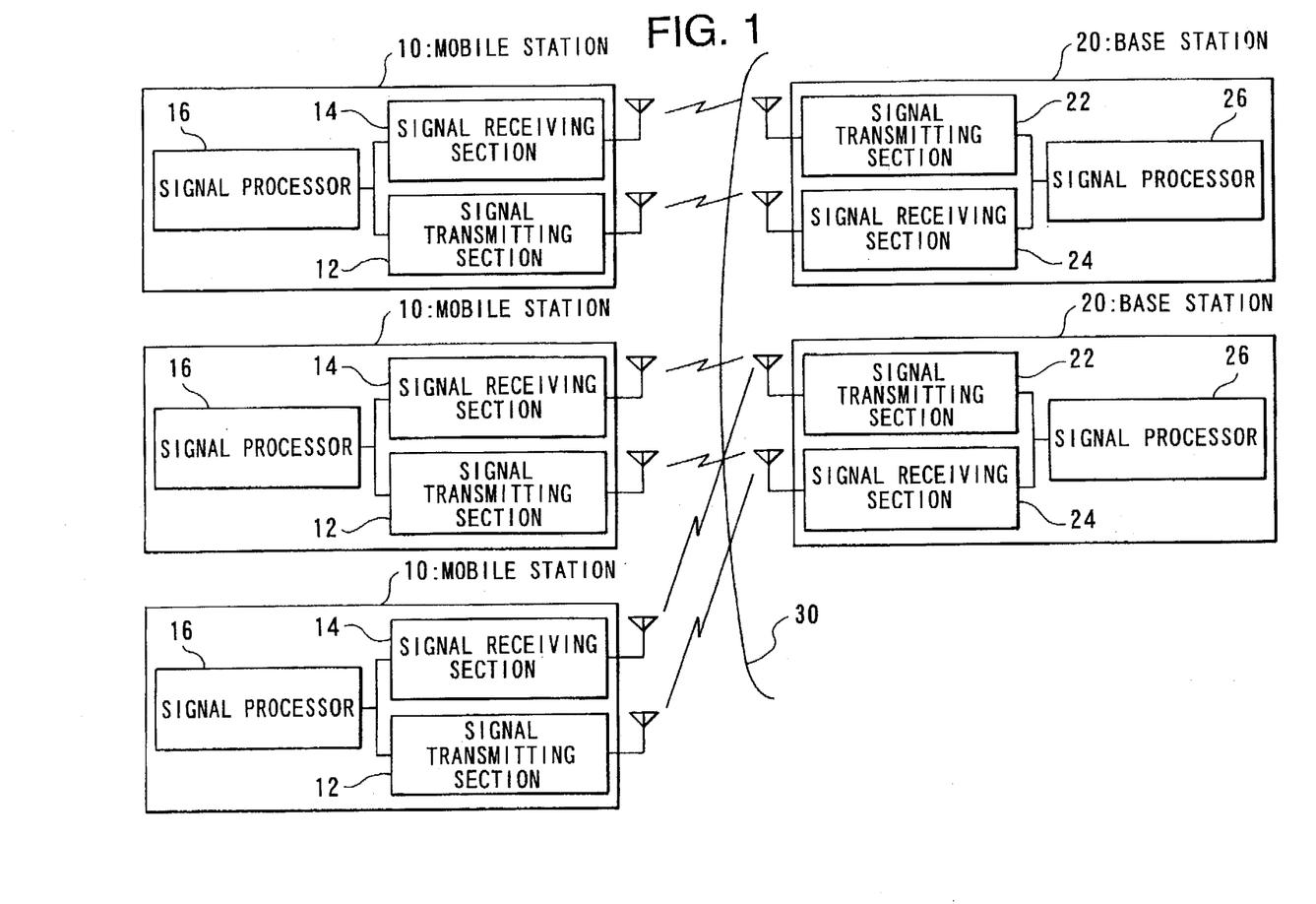
FIG. 1 is a block diagram showing a construction of a communication system in Embodiment 1.

FIG. 1 shows a functional construction of a communication system in Embodiment 1 of the present invention. This communication system comprises a network 30 with a plurality of base stations 20 (two base stations 20 are illustrated in FIG. 1); and a plurality of mobile stations 10 (three mobile stations 10 are illustrated in FIG. 1). Each of the mobile stations 10 includes a signal processor 16 for processing an outgoing and an incoming signal, a transmitting section 12 for processing a transmittal signal generated by the signal processor 16, and a receiving section 14 for processing a received signal and transmitting it to the signal processor 16. Each base station 20 includes, as case the mobile 10, a signal processor 26 for processing an outgoing and an incoming signal, a transmitting section 22 for processing a transmittal signal generated by the signal processor 26, and a receiving section 24 for processing a received signal and transmitting it to the signal processor 26.

In this embodiment, the transmitting sections 12 and 22 make a decision as to whether a forward error correction encoding operation should be performed based on the length of transmittal signal (signal length). The receiving sections 14 and 24 detect whether the received signal is encoded in a forward error correction format and decode the forward error correction code of the received signal in case the received signal is encoded in a forward error correction format.

Figure 2:
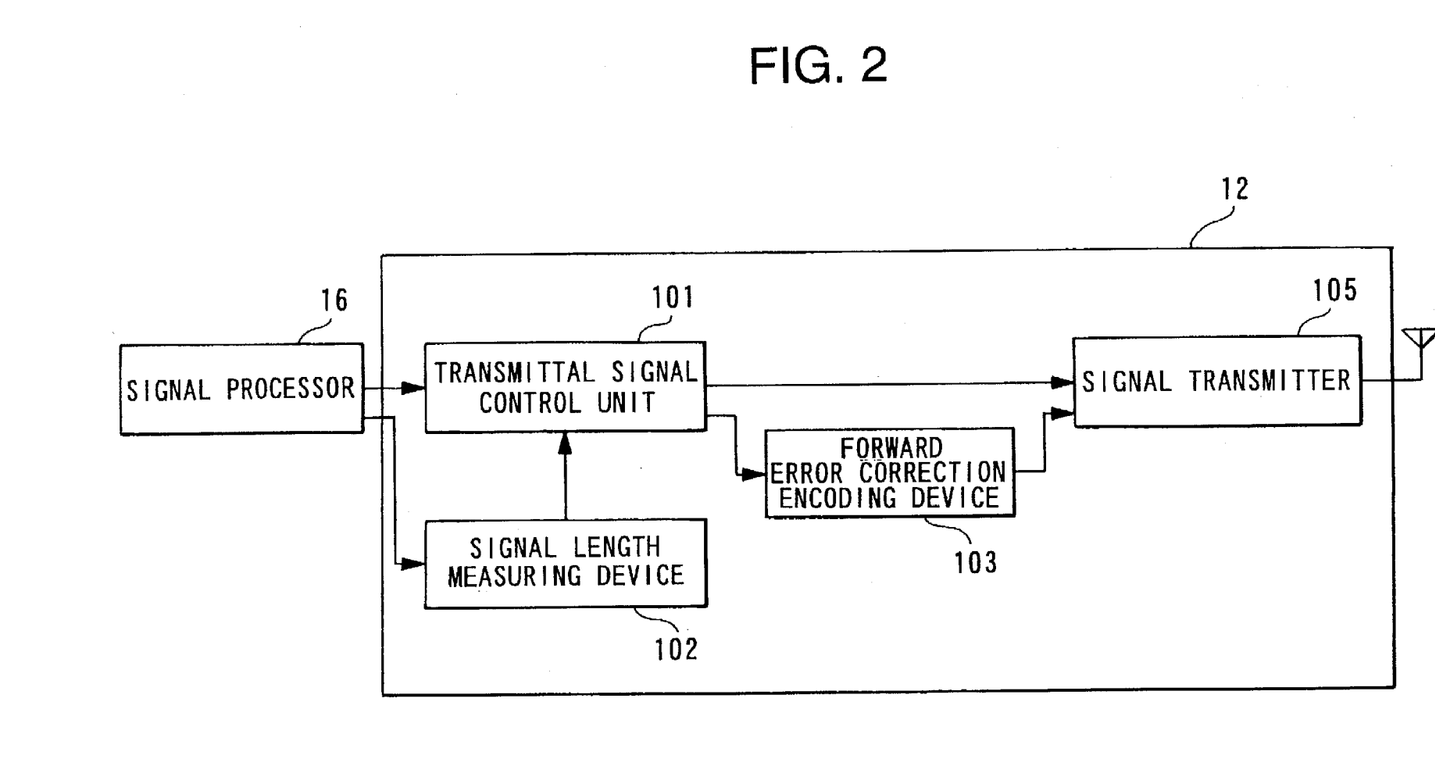
FIG. 2 is a block diagram showing a construction of a transmitting section 12 in Embodiment 1.

FIG. 2 shows a detailed functional block diagram of the transmitting section 12 in each mobile station 10. In FIG. 2, a signal length measuring device 102 measures the length of the transmittal signal. In this case, the signal length measuring device 102 detects the signal length with reference to signal length data contained in the transmittal signal. The signal length data show the length of the transmittal signal and are arranged, for example, at a header portion of the transmittal signal by a processing operation of the signal processor 16. In case the transmittal signal contains no signal length data, the signal length measuring device 102 may be arranged to actually measure the length of the transmittal signal. Since the signal processor 16 for processing the transmittal signal, can recognize the length of the transmittal signal at the time the transmittal signal is processed, the signal length thus recognized may be transmitted to the signal length measuring device 102.

A transmittal signal control unit 101 makes a decision as to whether the transmittal signal should be encoded in a forward error correction format, based on the signal length detected by the signal length measuring device 102. It is known that the under-listed relation exists between a signal length and a transmission success rate;

$$P=(1-E)^L \quad (1)$$

where P is a transmission success rate of a signal, L is a signal length, and E is an error rate per unit length of a signal. If a desired transmission success rate is represented by Pth, it is possible to obtain a signal length Lth, which satisfies such a desired transmission success rate, from the following equation.

$$Lth=\log Pth/\log(1-E) \quad (2)$$

Accordingly, it is known that a sufficient degree of forward error correction encoding operation with respect to a signal whose signal length is longer than Lth, should be made prior to transmission because a desired transmission success rate would otherwise be unable to obtain, whereas a signal, whose signal length is equal to or shorter than Lth, should be directly transmitted without being subjected to forward error correction encoding operation because a desired transmission success rate can be obtained as it is. As for the transmittal signal control unit 101 of this embodiment, a reference signal length Lth corresponding to the desired transmission success rate Pth is preliminarily set. Thus, the transmittal signal control device 101 compares the signal length detected by the signal length measuring device 102 with the reference signal length Lth and makes a judgment as to whether the forward error correction encoding operation should be made, based on a result of the comparison.

When the transmittal signal control unit 101 made a judgment that forward error correction encoding operation should be made, a forward error correction encoding device 103 encodes the transmittal signal in a forward error correction format. A signal transmitter 105 transmits a transmittal signal coming from the transmittal signal control unit 101 or the forward error correction encoding device 103 to the radio channel. Since a functional construction of the signal transmitter 22 of each base station 20 is the same as that of the signal transmitter section 12, detailed description thereof is omitted.

Figure 3:
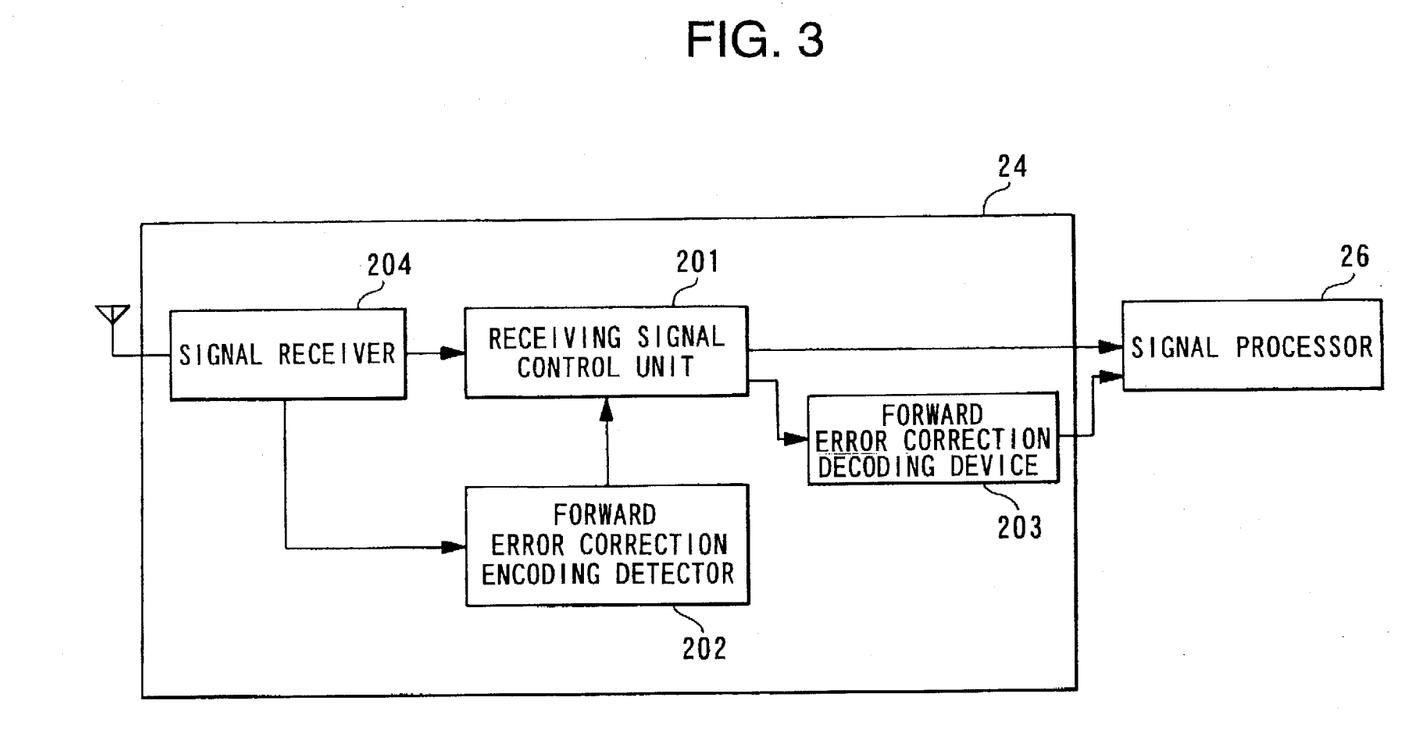
FIG. 3 is a block diagram showing a construction of a receiving section 24 in Embodiment 1.

FIG. 3 shows a block diagram of a signal receiver section 24 of the base station 20. In FIG. 3, a signal receiver 204 receives a signal from the radio channel. A forward error correction encoding detector 202 detects whether or not a signal received by the signal receiver 204 is encoded in a forward error correction format. A receiving signal control unit 201 makes a judgment as to whether or not the received signal should be decoded in forward error correction code, based on a result of the judgment made by the forward error correction encoding detector 202. When the judgment of the receiving signal control unit 201 is made in the affirmative, a forward error correction decoding device 203 decodes the forward error correction code of the received signal. The signal processor 26 processes the received signal from the receiving signal control unit 201 or the forward error correction decoding device 203. A functional construction of the signal receiving section 14 is the same as the signal receiving section 24.

Figure 4:
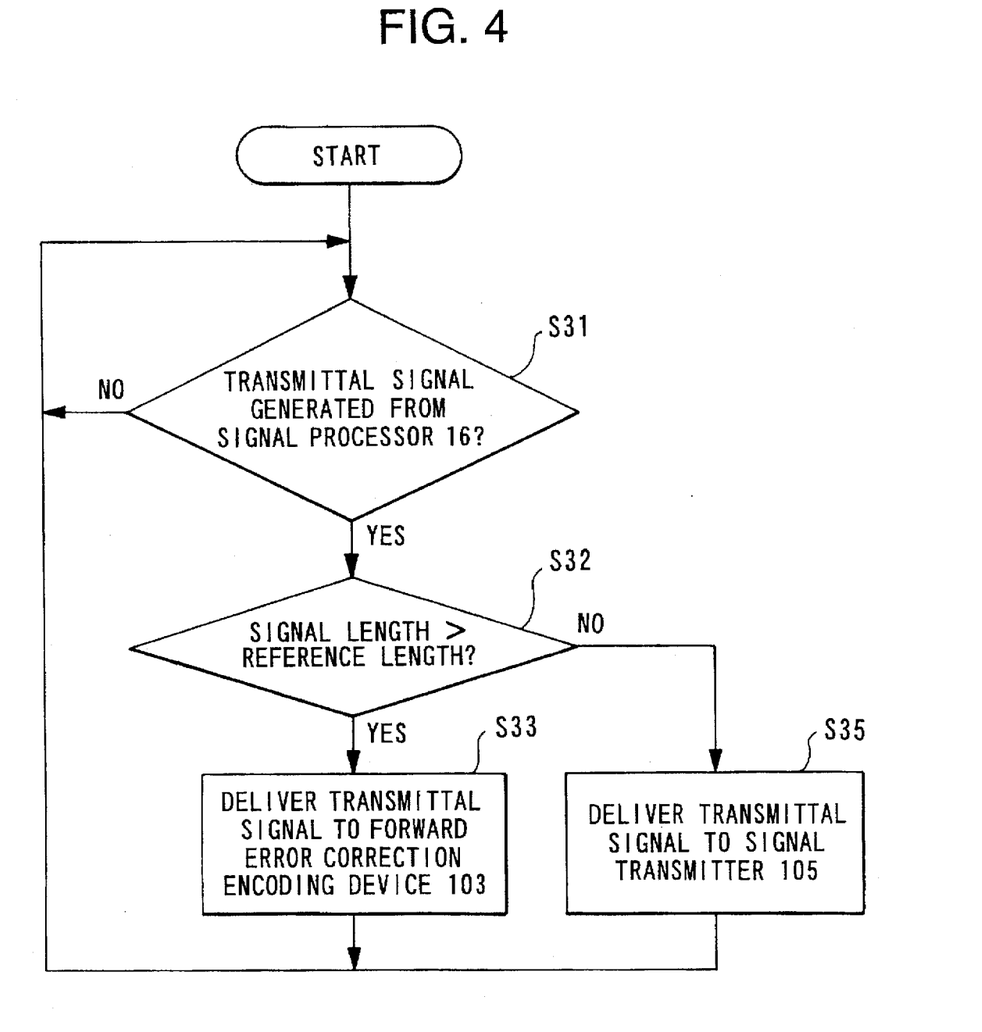
FIG. 4 is a flow chart showing the operation of a transmission control unit 101 of the transmitting section 12 in Embodiment 1.

Operation of this constructed embodiment will now be described. FIG. 4 is a flow chart showing the operation of the signal transmitting section 12 of the mobile station 10. First, in Step (hereinafter simply referred to as S ) 31, the transmittal signal control unit 101 of the signal transmitting section 12 monitors the transmittal signal generated by the signal processor 16. When the transmittal signal is generated, the transmittal signal control unit 101 refers to the signal length detected by the signal length measuring device 102 (S32) and makes a judgment as to whether the signal length is longer than a predetermined reference value (S31). If the judgment result is affirmative here (S33), the transmittal signal is delivered to the forward error correction encoding device 103 in order to obtain a higher reliability of the transmittal signal (S34). As a consequence, the forward error correction encoding device 103 performs the forward error correction encoding operation with respect to the transmittal signal and transmits it to the radio channel by using the signal transmitter 105.

On the other hand, in case the signal length is equal to or smaller than the predetermined reference value, the transmittal signal control unit 101 delivers the transmittal signal directly to the signal transmitter 105 so that the transmittal signal is transmitted to the radio channel (S34). Since the operation of the signal transmitting section 22 of the base station 20 is the same as that of the signal transmitting section 12, detailed description thereof is omitted.

Figure 5:
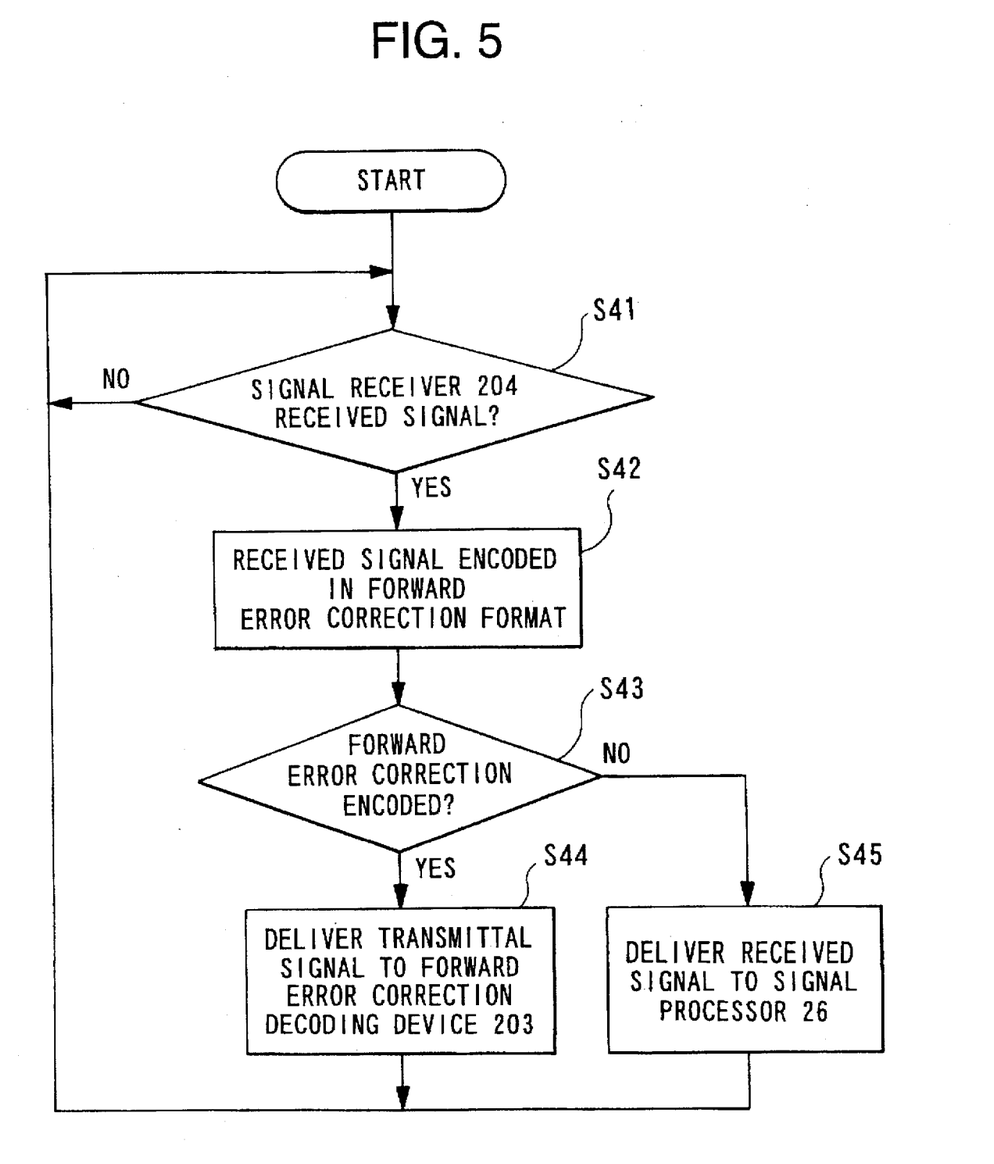
FIG. 5 is a flow chart showing the operation of a receiving signal control unit 201 of the receiving section 24 in Embodiment 1.

FIG. 5 shows an operational procedure of the signal receiving section 24. The receiving signal control unit 201 of the signal receiving section 24 monitors the signal receiver 204 (S41). When the signal receiver 204 receives a signal, the forward error correction encoding detector 202 is caused to detects whether the received signal is encoded in a forward error correction format (S42). If the received signal is encoded, the received signal is delivered to the forward error correction decoding device 203 (S44). Then, the forward error correction decoding device 203 decodes the forward error correction code of the received signal and delivers it to the signal processor 26. If the received signal is not encoded, the received signal is delivered directly to the signal processor 26. The procedures so far described are the signal receiving procedures of the base station 20. The operational procedures of the signal receiving section 14 of the mobile station 10 is the same as those of the signal receiving section 24.

According to this embodiment, since a judgment is made whether a forward error correction encoding should be made in accordance with continuously detecting the signal length of the transmittal signal during transmission, those transmittal signals which have lower error probabilities are not encoded in a forward error correction format. For this reason, wasteful consumption of the transmittal data capacity on the radio channel can be prevented in maintaining the desired transmission success rate.

In the description so far made, the signal transmitting section and the signal receiving section of the mobile station 10, and the signal transmitting section and the signal receiving section of the base station 20 have the same functional construction, and the respective signal transmitting section encodes the transmittal signal in a forward error correction format by the signal transmitting section based on the communication conditions (signal length). However, only the signal transmitting section of either the base station or the mobile station may be designed to encode the transmittal signal in a forward error correction format on the basis of signal length.

(Embodiment 2)

In this embodiment, signal transmitting sections of a mobile station 10 and a base station 20 make a judgment as to whether the transmittal signal should be encoded in a forward error correction format on the basis of the kind of the transmittal signal. For example, communication control signals, which require a higher reliability, are encoded in a forward error correction format, and other transmittal signals, which required a smaller degree of reliability, are not encoded.

On the other hand, the signal receiving section detects, as in the case with the preceding embodiment, whether the received signal is encoded in a forward error correction format. If the detected result is affirmative, a forward error correction decoding operation is performed.

Figure 6:
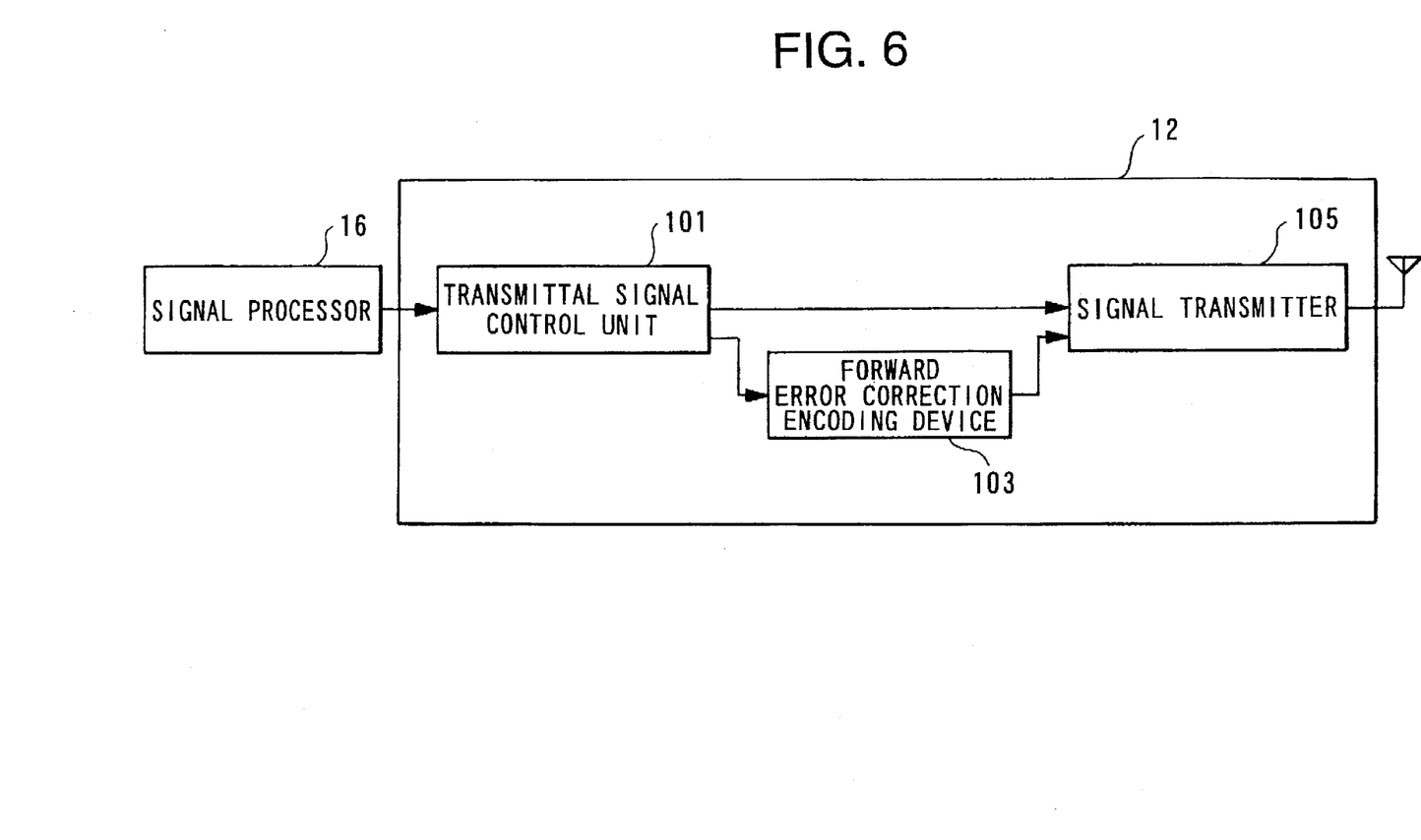
FIG. 6 is a block diagram showing a construction of a mobile station 10 in Embodiment 2.

FIG. 6 shows a functional block diagram of the signal transmitting section 12 of the mobile station 10. In this block diagram, although there is no provision of the signal length measuring device 102 unlike the construction shown in FIG. 2, the remaining construction is generally the same as the construction shown in FIG. 2.

Figure 7:
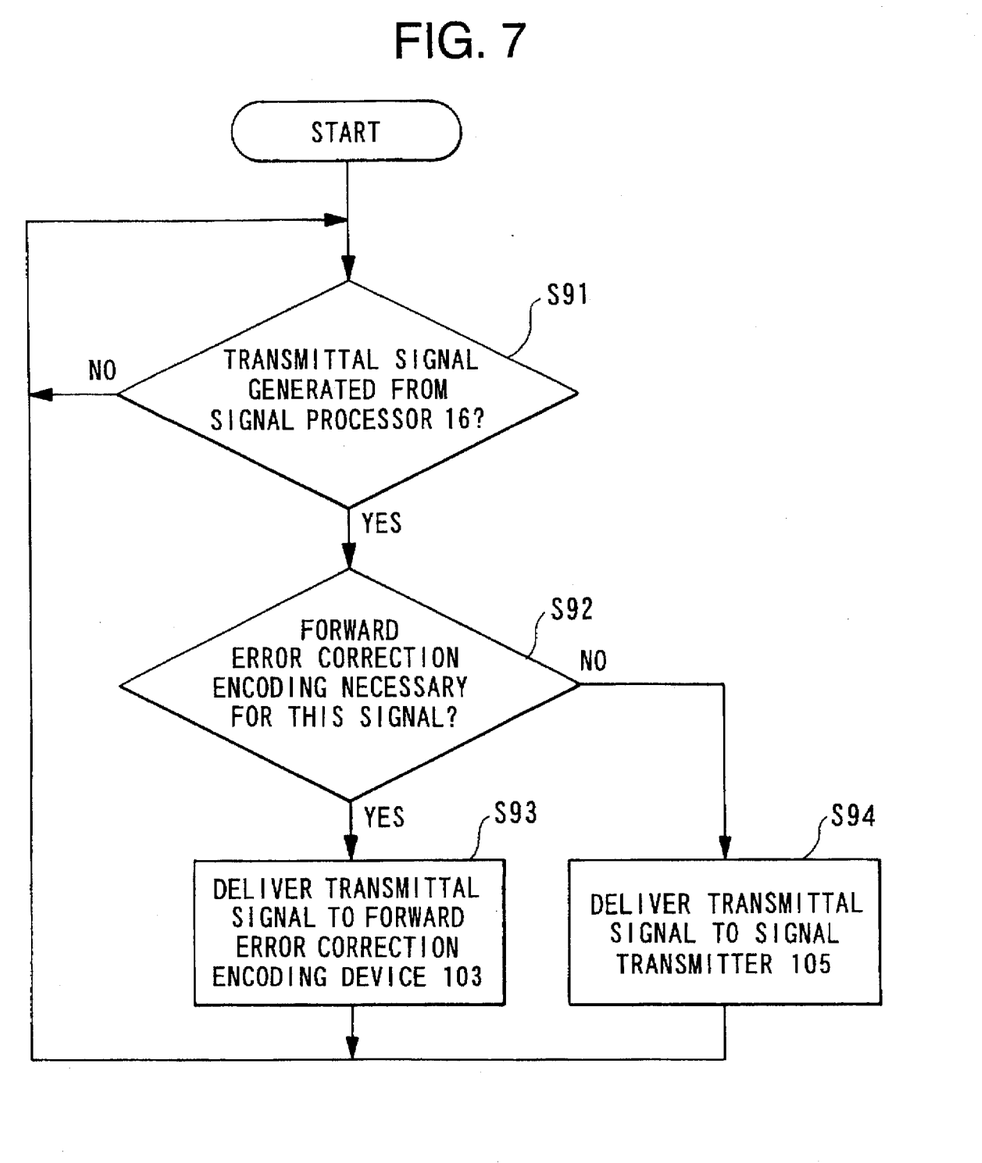
FIG. 7 is a flow chart showing the operation of a transmission control unit 101 in Embodiment 2.

FIG. 7 shows operational procedures of a transmittal signal control unit 101 of a signal transmitting section of this embodiment. The transmittal signal control unit 101 monitors the signal transmitted from a signal processor 16 (S91). Upon generation of the transmittal signal, a judgment is made as to the kind of the transmittal signal (S92). If the kind of the transmittal signal requires a predetermined forward error correction encoding operation, the transmittal signal is delivered to a forward error correction encoding device 103 (S93).

In this embodiment, those signals that require a forward error correction encoding operation are judged as follows:

(1) Control signals used for controlling the lines require higher transmission success probabilities and should, therefore, be subjected to forward error correction encoding operation.

(2) Of all signals used for information transmission by users, those information signals for which no automatic repeat request is made (namely, those signals for which no confirmation is made as to transmission success and a transmission is made only once) require quite high transmission success probabilities, and should, therefore, be subjected to forward error correction encoding treatment.

(3) Of all signals used for data transmission by users, those data signals for which automatic repeat request are made (namely, those data signals which are repeatedly transmitted by a predetermined number of times or until they can be transmitted successfully) do not require a strictly high degree of transmission success probabilities and therefore, should not be subjected to forward error correction encoding treatment.

As described above, in this embodiment, the kind of signals is classified into three categories and the necessity of forward error correction encoding treatment is judged based on the kind of signals. Here, the kind of signals is detected, for example, as follows.

In a signal processing procedure in the signal processor 16, the procedure to be executed differs depending on the kind of signals. Accordingly, by recognizing the procedure executed for the signal, the kind of this signal can be detected. Then, the signal processor 16 adds a discrimination datum, which corresponds to the detected result, to the transmittal signal and transmits it to the transmittal signal control unit 101. In this case, the discrimination datum is added, for example, to a header section of the transmittal signal. The transmittal signal control unit 101 recognizes the kind of signal from the discrimination data added to the header section or the like and makes a judgment as to whether a forward error correction encoding treatment is made based on the kind of signal.

Since the signal processor 16 generally recognizes what kind of signal is generated, no special procedure for detecting the kind of signal is required. Aside from its task for sending a transmittal signal, the signal processor 16 may be designed to output a discrimination datum indicative of the kind of signal to the transmittal signal control unit 110.

If the kind of transmittal signal requires a predetermined forward error correction encoding treatment, the transmittal signal is transmitted to the forward error correction encoding device 103 (S93) where the transmittal signal is encoded in a forward error correction format and then transmitted to the radio channel by the signal transmitter 105. On the other hand, if it is judged that no forward error correction encoding treatment is required in S92, the transmittal signal is transmitted directly to the signal transmitter 105 and then transmitted to the radio channel (S94).

Since operational procedures of the signal receiving section 14 of the mobile station 10 and the signal receiving section 24 of the base station 20 are the same as those of the signal receiving section of Embodiment 1, description thereof is omitted. Either the mobile station 10 or the base station 20 may be design to make a judgment as to whether the transmittal signal should be encoded in a forward error correction format on the basis of the kind of transmittal signal, and the other mobile station, 10 or 20, encodes the transmittal signal on the basis of whether the received signal is encoded in a forward error correction format.

(Embodiment 3)

In this embodiment, the mobile station 10 encodes the transmittal signal in a forward error correction encoding format just for a predetermined time interval after receiving signal encoded in a forward error correction format.

Figure 8:
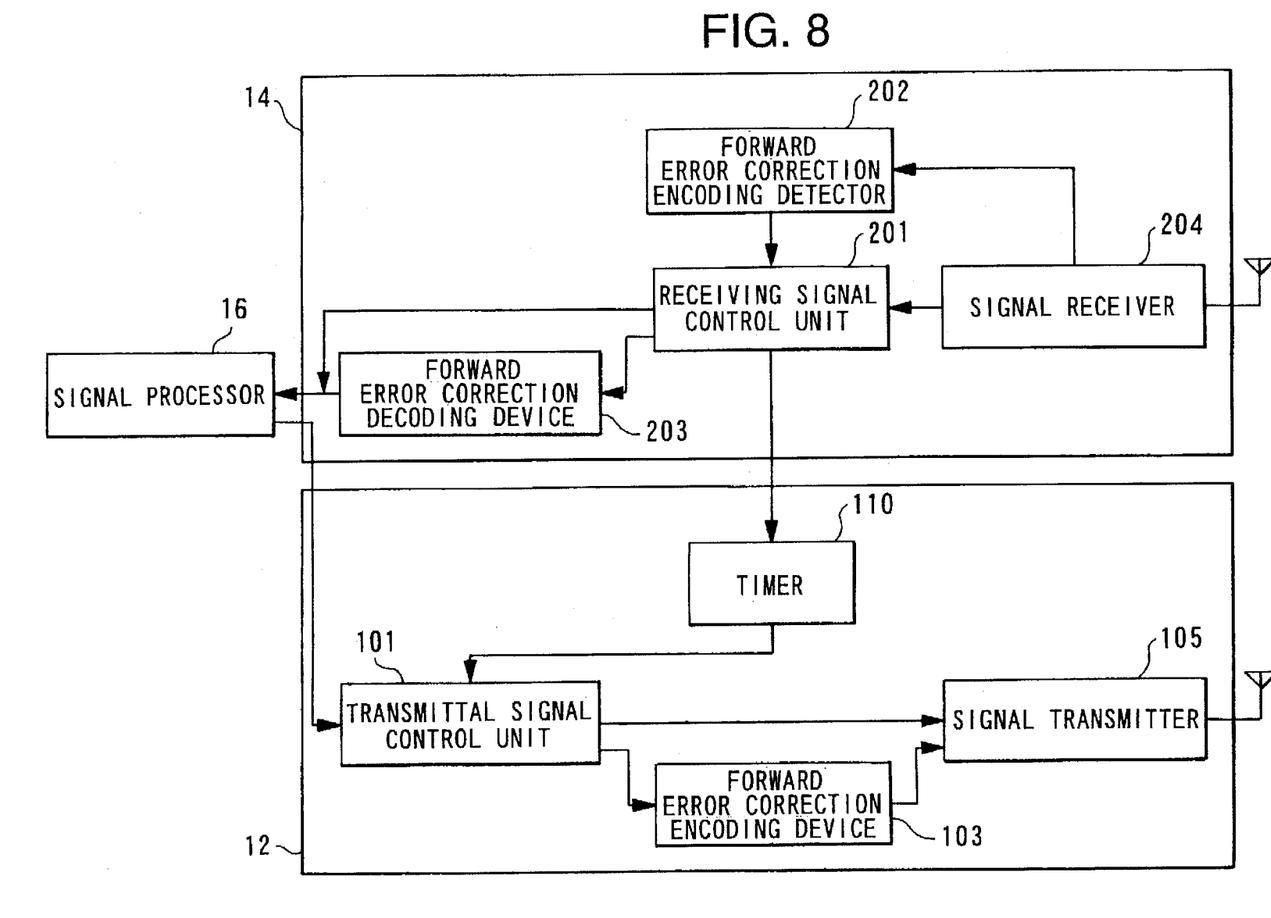
FIG. 8 is a block diagram showing a construction of the mobile station 10 in Embodiment 3.

FIG. 8 is a block diagram showing the functions of the mobile station 10 of this embodiment. In addition to a provision of the construction shown in FIG. 2 of Embodiment 2, the signal transmitting section 12 of the mobile station 10 includes a timer 110 for counting a predetermined time. Since an overall construction of the communication system, as well as a construction and operation of the base station 20, is the same as those of Embodiment 1, description thereof is omitted.

Figure 9:
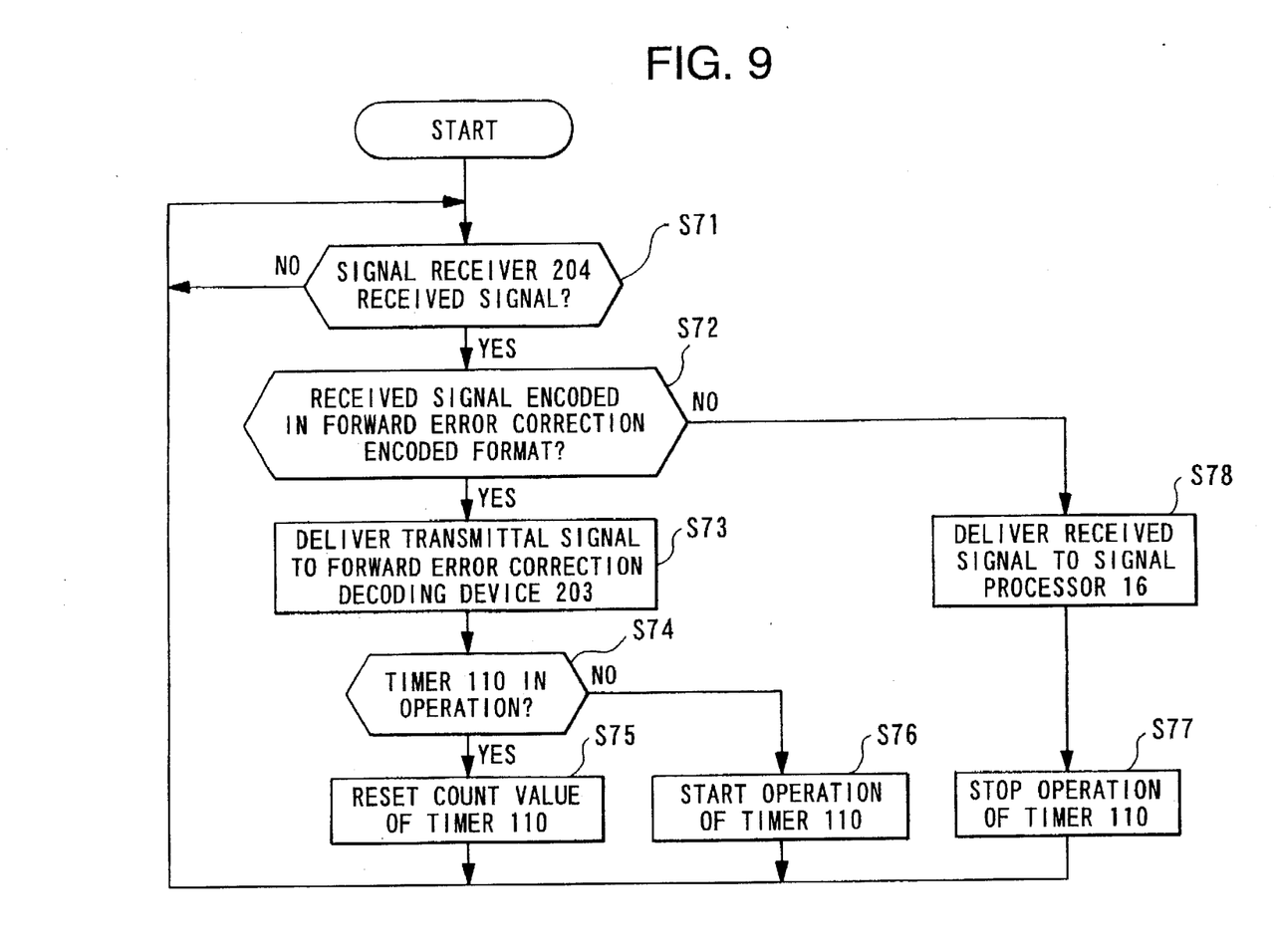
FIG. 9 is a flow chart showing the operation of the receiving signal control unit 201 in Embodiment 3.

Characteristic operation of this embodiment will now be described. FIG. 9 is a flow chart showing operation of the receiving signal control unit 201 of the mobile station 10. First, it is judged whether the signal receiver 204 received a signal, by using the receiving signal control unit 201 (S71). When a signal received, the forward error correction encoding detector 202 refers to whether the forward error correction encoding format of the received signal is detected (S72). If the received signal was encoded, the received signal is delivered to the forward error correction decoding device 203 (S73). The forward error correction decoding device 203 then decodes the forward error correction code of the received signal and delivers the decoded signal to the signal processor 16. As soon as the received signal is delivered to the forward error correction decoding device 203, it is judged whether the timer 110 is in operation (S74). If the timer 110 is in its stopped state, the timer 110 begins to start (S76). In contrast, if the timer 110 is in operation, the counted value is reset (S75). In this way, when a signal encoded in a forward error correction format is received, the timer 110 begins to start time or the counted time is reset (i.e., restart of counting).

On the other hand, if the received signal is not encoded in a forward error correction format, the received signal is delivered to the signal processor 16 (S78) and the timer 110 is stopped (S77).

Figure 10:
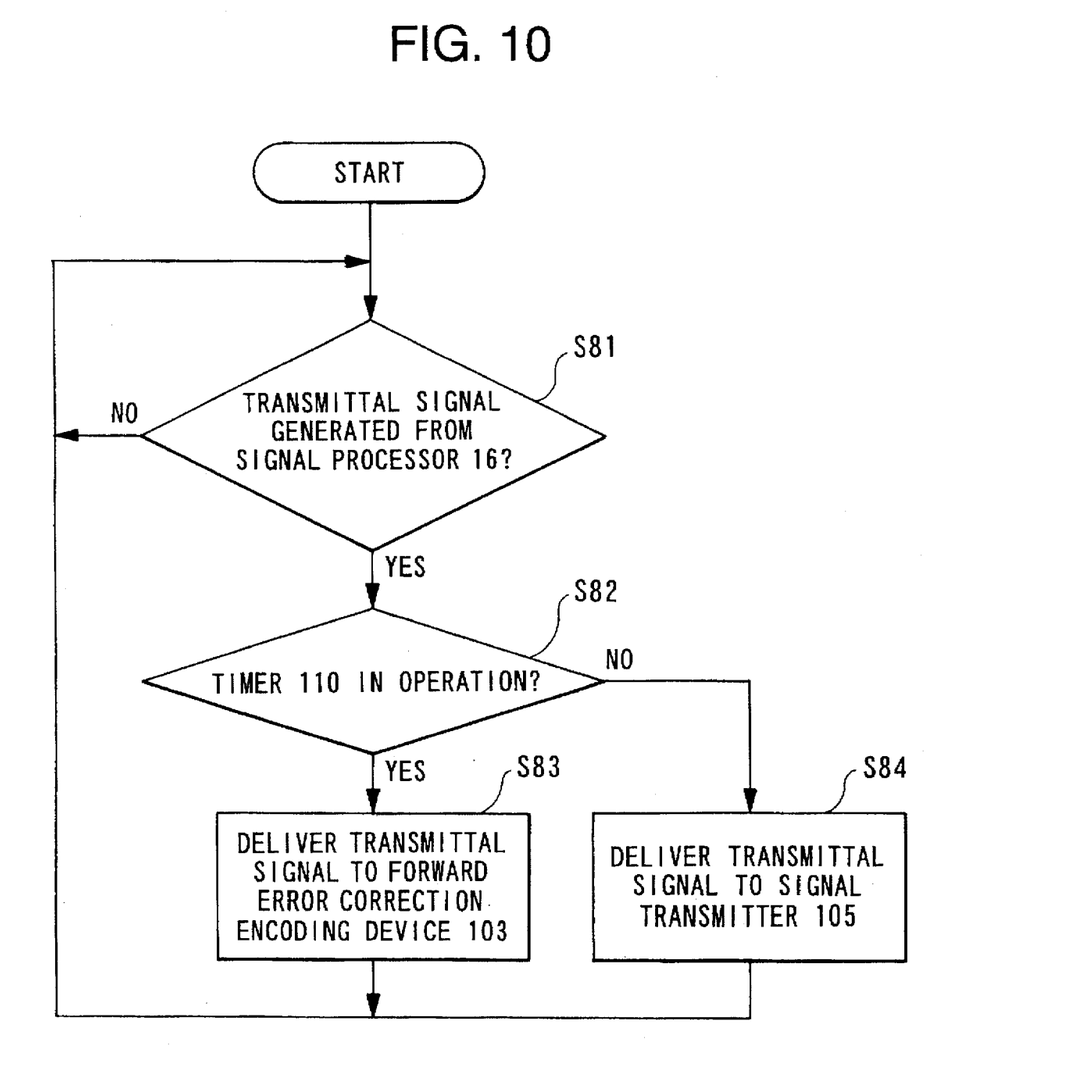
FIG. 10 is a flow chart showing the operation of the receiving signal control unit 101 in Embodiment 3.

Operation of the transmittal signal control unit 101 will now be described with reference to FIG. 10. The transmittal signal control unit 101 monitors the signal generated by the signal processor 16 (S81) and refers to the state of the timer 110 when the transmittal signal is generated (S82). If the timer 110 is in operation, the transmittal signal is delivered to the forward error correction encoding device 103. Then, the forward error correction encoding device 103 encodes the signal in a forward error correction format and transmits it to the radio channel by using the signal transmitter 105. On the other hand, if the timer 110 is in its stopped state, the signal is transmitted from the signal transmitter 105 to the radio channel directly.

Here, the state of the timer 110 is controlled through the procedures shown in FIG. 9 but the timer 110 still keeps operating for a predetermined time interval even after receiving the encoded signal (see S75 and S76). Accordingly, in the transmitting procedures of FIG. 10, the transmittal signal is also encoded in a forward error correction format within the predetermined time interval after the encoded signal is received last. After the passage of the predetermined time period, or when a non-encoded signal in a forward error correction format is received, the procedure for encoding the transmittal signal in a forward error correction format is stopped.

As mentioned above, in this embodiment, even when a signal encoded in a forward error correction format was received, the encoding procedure is stopped only after the passage of the time counted by the timer. Accordingly, undue encoding is not performed and wasteful consumption of the capacity of transmission data of the radio channel can be prevented.

It should be noted that both the mobile station 10 and the base station 20 may have the same transmitting and receiving functions. As in the cases with Embodiments 1 and 2, one terminal (mobile station 10 or base station 20) may be designed to make a judgment as to whether the forward error correction encoding operation should be made on the basis of the length on kind of the transmittal signal, whereas the other terminal (base station 20 or mobile station 10) makes a judgment whether the transmittal signal should be encoded in a forward error correction format on the basis of whether the received signal is encoded in a forward error correction format.

(Others)

(1) In Embodiment 1, the following modification can be made. Since the signal length has an intimate relation to error rate, tables showing a relation between the signal length and various conditions relevant to the signal length, or the like may be preliminarily prepared so that a judgment can be made as to whether a forward error correction encoding operation should be made depending on whether the conditions obtained from the table or the like can be satisfied.

(2) A communication system may be made by combining Embodiments 1 through 4 in various ways. For example, it is possible that a judgment is made as to whether the transmittal signal should be encoded in a forward error correction format on the basis of two or more parameters of the kind of transmittal signal and the length of transmittal signal. Also, line quality may be added to the parameters. Furthermore, reference values, function values and various values on the table, which are to be used in this arrangement, may be received from the other party of the communication.

(3) In Embodiment 3, the transmittal signal is encoded in a forward error correction format just for a predetermined time after a forward error correction coded signal is received. In the alternative, it is possible that the transmittal signal is encoded in a forward error correction format as a general role and the encoding is not performed for a predetermined time interval when the signal received from the counterpart terminal, is not encoded in a forward error correction format.

This type of construction is suitable to be used for such occasions where the line quality is usually not good but it occasionally turns out good. That is, when the counterpart terminal performs the forward error correction encoding operation, the line quality can be judged good. Accordingly, a transmittal signal is transmitted without being encoded in a forward error correction format for a predetermined time interval in order to enhance communication efficiency, and the transmittal signal is subjected to forward error correction encoding treatment prior to transmission in all other cases.

Also, it is possible that no timer is employed and a judgment is made as to whether the transmittal signal should be encoded in a forward error correction format depending on whether the received signal is encoded in a forward error correction format.

As described herein before, there are a wide variety of methods for determining whether the transmittal signal should be encoded in a forward error correction format depending on whether the received signal is encoded in the manner as mentioned. It is important that a most suitable method is selected according to the state of the communication channel, required transmission success probabilities, and so on.

(4) As one example of the forward error correction encoding operation, there may be employed such known encoding methods as, for example, BCH forward error correction encoding operation, Reed-Solomon forward error correction encoding operation, and the like.

What is claimed is:

1. A terminal for performing a communication through a radio channel comprising:

signal processing means for generating a transmittal signal;

forward error correction encoding means for encoding the transmittal signal, which was generated by said processing means, in a forward error correction format, in case the length of the transmittal signal satisfies predetermined conditions;

first transmission means for transmitting the transmittal signal, encoded in a forward error correction format by said forward error correction encoding means, through said radio channel; and second transmission means for transmitting the transmittal signal, generated by said signal processing means, through said radio channel, in case the length of the transmittal signal does not satisfy the predetermined conditions.

2. A terminal for performing a communication through a radio channel comprising:

signal processing means for generating a transmittal signal;

forward error correction encoding means for encoding the transmittal signal, generated by said signal processing means, in a forward error correction format, in case the kind of the transmittal signal satisfies predetermined conditions;

first transmission means for transmitting the transmittal signal, encoded in a forward error correction format by said error correction encoding means, through said radio channel; and second transmission means for transmitting the transmittal signal, generated by said signal processing means, through said radio channel, in case the kind of the transmitting signal does not satisfy the predetermined conditions.

3. A terminal for performing a communication through a radio channel comprising:

judgment means for judging whether a signal, received through said radio channel, is encoded in a forward error correction format; and forward error correction decoding means for decoding the forward error correction code of the received signal, in case the received signal is encoded in a forward error correction format.

4. A terminal for performing a communication through a radio channel comprising:

judgment means for judging whether a signal, received through said radio channel, is encoded in a forward error correction format;

error correction decoding means for decoding the forward error correction code of the received signal, in case the received signal is encoded in a forward error correction format;

signal processing means for generating a transmittal signal;

first transmission means for transmitting the signal, generated by said signal processing means, in a forward error correction format through said radio channel, in case the received signal, received last through said radio channel, is encoded in a forward error correction format; and second transmission means for transmitting the transmittal signal, generated by said signal processing means, through said radio channel, in case the received signal, received last through said radio channel, is not encoded in a forward error correction format.

5. A terminal for performing a communication through a radio channel comprising:

judgment means for judging whether a signal, received through said radio channel, is encoded in a forward error correction format;

forward error correction decoding means for decoding the forward error correction code of the received signal, in case the received signal is encoded in a forward error correction format;

signal processing means for generating a transmittal signal;

first transmission means for transmitting the transmittal signal in a forward error correction format through said radio channel after the passage of a predetermined interval from when a signal is received last through said radio channel, in case the received signal is encoded in a forward error correction format; and second transmission means for transmitting the transmittal signal, generated by said signal processing means, through said radio channel after the passage of a predetermined interval from when a signal was received last through said radio channel, in case the received signal is not encoded in a forward error correction format.

6. A terminal for performing a communication through a radio channel comprising:

judgment means for judging whether a signal, received through said radio channel, is encoded in a forward error correction format;

forward error correction decoding means for decoding the forward error correction code of the received signal, in case the received signal is encoded in a forward error correction format;

signal processing means for generating a transmittal signal;

first transmission means for transmitting the transmittal signal through said radio channel after the passage of a predetermined interval from when a signal was received last through said radio channel, in case the received signal is not encoded in a forward error correction format; and second transmission means for transmitting the transmittal signal, generated by said signal processing means, through said radio channel after the passage of a predetermined interval from when a signal was received last through said radio channel, in case the received signal is encoded in a forward error correction format.

7. A terminal according to one of claims 1 through 6, wherein said terminal is a mobile station for performing a communication through a radio channel.

8. A network having base stations for performing a communication through a radio channel, at least one of said base stations being said terminal as defined in one of claims 1 through 6.

9. A communication system having base stations and mobile stations for performing a communication through a radio channel, wherein at least one of said base stations is said terminal as defined in one of claims 1, 2, 4, 5 or 6, said base stations for communicating with said mobile stations including:

judgment means for judging whether a signal, received through said radio channel, is encoded in a forward error correction format; and forward error correction decoding means for decoding the forward error correction code of the received signal, in case the received signal is encoded in an error format.

10. A communication system according to claim 9, wherein said base stations for communicating with said at least one mobile station further includes:

signal processing means for generating a transmittal signal;

first transmission means for transmitting the transmittal signal in a forward error correction format in a predetermined interval from when a signal was received last through said radio channel, in case the received signal is encoded in a forward error correction format; and second transmission means for transmitting the transmittal signal, generated by said signal processing means, through said radio channel, in case the signal, received last through said radio channel, is not encoded in a forward error correction format and in case a predetermined interval has passed since when the signal had been received last through said radio channel.

11. A communication system having base stations and mobile stations for performing a communication through a radio channel, wherein at least one of said base stations is said terminal as defined in one of claims 1, 2,4,5 or 6, at least one of said mobile stations including:

judgment means for judging whether a signal, received through said radio channel, is encoded in a forward error correction format;

forward error correction decoding means for decoding the forward error correction code of the received signal, in case the received signal is encoded in an error format;

signal processing means for generating a transmittal signal;

first transmission means for transmitting the transmittal signal through said radio channel after the passage of time from when a signal was received last through said radio channel, in case the received signal is not encoded in a forward error correction format; and second transmission means for transmitting the transmittal signal, generated by said signal processing means, in a forward error correction format through said radio channel, in case the signal, received last through said radio channel, is encoded in a forward error correction format and in case a predetermined interval has passed since when the signal had been received last through said radio channel.

12. A communication system having base stations and mobile stations for performing a communication through a radio channel, wherein at least one of said mobile stations is said terminal as defined in one of claims 1,2,4, or 6, at least one of said base stations including:

judgment means for judging whether a signal, received through said radio channel, is encoded in a forward error correction format;

forward error correction decoding means for decoding the forward error correction code of the received signal, in case the received signal is encoded in an error format;

signal processing means for generating a transmittal signal;

first transmission means for transmitting the transmittal signal through said radio channel after the passage of a predetermined period from when a signal was received last through said radio channel, in case the received signal is not encoded in a forward error correction format; and second transmission means for transmitting the transmittal signal, generated by said signal processing means, in a forward error correction format through said radio channel, in case the signal, which was received last through said radio channel, is encoded in a forward error correction format and in case a predetermined interval passed since the signal was received last through said radio channel.

13. A communication system having base stations and mobile stations for performing a communication through a radio channel, at least one of said base stations being said terminal as defined in one of claims 1,2,4,5 or 6, said mobile stations for communicating with said base stations including:

judgment means for judging whether a signal, received through said radio channel, is encoded in a forward error correction format; and forward error correction decoding means for decoding the forward error correction code of the received signal, in case the received signal is encoded in an error format.

14. A communicating system according to claim 13, wherein said mobile stations for communicating with said at least one base station further includes:

signal processing means for generating a transmittal signal;

first transmission means for transmitting the transmittal signal in a forward error correction format in a predetermined interval from when a signal was received last through said radio channel, in case the received signal is encoded in a forward error correction format; and second transmission means for transmitting the transmittal signal, generated by said signal processing means, through said radio channel, in case the received signal, received last through said radio channel, is not encoded in a forward error correction format and in case a predetermined interval has passed since the signal had been received last through said radio channel.

* * * * *